United States Patent [19]

Puccio

[11] E Re. 31,283

[45] Reissued Jun. 21, 1983

[54] ELASTOMERIC EXPANSION SEAL

[75] Inventor: Guy S. Puccio, Snyder, N.Y.

[73] Assignee: Acme Highway Products Corporation, Amherst, N.Y.

[21] Appl. No.: 253,784

[22] Filed: Apr. 13, 1981

Related U.S. Patent Documents

Reissue of:

[64] Patent No.: 4,179,226
Issued: Dec. 18, 1979
Appl. No.: 947,489
Filed: Oct. 2, 1978

[51] Int. Cl.[3] ..... E01C 11/04

[52] U.S. Cl. ..... 404/68; 52/396; 49/475

[58] Field of Search ..... 404/68, 69, 64; 52/396; 49/475

[56] References Cited

U.S. PATENT DOCUMENTS

| | | | |
|---|---|---|---|
| 2,908,949 | 10/1959 | Frehse | 404/68 X |
| 3,485,149 | 12/1969 | Boney | 404/64 |
| 3,585,910 | 6/1971 | Brown | 404/69 |
| 3,626,822 | 12/1971 | Koster | 404/69 |
| 3,877,829 | 4/1973 | Honegger | 404/69 |
| 3,994,609 | 11/1976 | Puccio | 404/69 |
| 4,007,994 | 2/1977 | Brown | 404/69 |
| 4,067,660 | 1/1978 | Puccio | 404/69 |
| 4,084,912 | 4/1978 | Pyle | 404/69 X |

FOREIGN PATENT DOCUMENTS

| | | | |
|---|---|---|---|
| 586790 | 4/1977 | Switzerland | 404/64 |

*Primary Examiner*—Nile C. Byers, Jr.
*Attorney, Agent, or Firm*—Christel, Bean & Linihan

[57] ABSTRACT

An expansion joint seal for use in roadways, bridges and the like adapted for use with a pair of elongated, parallel spaced-apart edge members defining a gap therebetween and each of the edge members having a generally C-shaped cavity opening towards said gap. The seal includes mounting beads on each of its longitudinal edges for reception within the aforesaid edge member cavities and a double walled, resilient web construction spanning the aforesaid gap and being attached to the mounting beads. The double walls of the web are disposed in an upper and lower relative relationship to one another and are connected to the mounting beads at correspondingly upper and lower portions thereon. The upper and lower web walls fold downwardly upon movement of the edge members towards one another and corresponding reduction in width of the gap. The upper and lower walls are connected to one another by a pair of downwardly extending struts which cause the upper and lower walls to fold in a desired manner while also providing additional strength to the configuration. The upper wall is surmounted by an inverted, V-shaped crown which folds upwardly away from the downwardly folding upper wall upon compression of the seal. The upwardly folding crown portion thereby functions to eject incompressibles out of the gap and/or to preclude the disposition of incompressibles in the gap.

15 Claims, 4 Drawing Figures

ELASTOMERIC EXPANSION SEAL

Matter enclosed in heavy brackets [ ] appears in the original patent but forms no part of this reissue specification; matter printed in italics indicates the additions made by reissue.

BACKGROUND OF THE INVENTION

This invention relates generally to expansion joint seals of the type used for sealing an expansion joint space or gap against the intrusion of dirt, water and other debris as for example might be encountered by expansion joints employed in roadway construction. More specifically, the present invention relates to an elastomeric expansion seal that may be employed in a joint assembly having elongated, metal edge members installed on either side of the gap as defined by a pair of structural members such as concrete slabs wherein the seal is connected between said edge members.

The subject invention includes mounting beads for affirmatively locking the longitudinal edges of the seal disclosed herein within edge member cavities being correspondingly formed therefor. Such mounting beads, and the edge members formed to cooperate therewith, are disclosed in applicant's U.S. Pat. No. 3,994,609 issued Nov. 30, 1976 and U.S. Pat. No. 4,067,660 issued Jan. 10, 1978, both being assigned to the assignee of the instant invention. The seals disclosed in applicant's aforesaid patents are generally known in the trade as "strip seals" in that they have a single seal wall disposed across an expansion gap and which is connected to both of the mounting beads.

The present invention, while incorporating mounting beads as considered hereinabove, involves a more substantial seal construction for spanning the gap between the beads.

An ever present concern in utilizing seals such as that considered herein which may be used in a roadway, is to protect the same against tears, damage and leaks. In considering such potential occurences with respect to the use of a seal, the instant invention provides a construction which more effectively, and with a high degree of dependability, overcomes such potential problems.

The prior art has considered the placement of upper and lower walls in an expansion seal for purposes of spanning an expansion gap, such as that shown in U.S. Pat. No. 4,007,994–Brown, issued Feb. 15, 1977. However, the mere placement of an upper and lower wall across an expansion gap which undergoes considerable variations with respect to the width thereof, does not yield the predictability and dependability of wear and movement as found in the construction of the instant invention.

SUMMARY OF THE INVENTION

Accordingly, one object of the present invention is to provide a new and improved elastomeric expansion seal having mounting or retaining beads along the longitudinal edges thereof for insertion into the cavity of an edge member and further having upper and lower webs connected between the beads with struts connected between such upper and lower webs or walls to control the movement thereof during expansion and contraction of the seal.

Another object of the present invention is to provide an improved elastomeric seal having upper and lower walls or webs connected between a pair of mounting beads wherein the upper web wall includes a crowned configuration which folds upwardly upon compression of the seal so as to eject incompressible debris from the gap in which the seal is disposed.

A further object of the present invention is to provide the aforesaid improved elastomeric seal which does not rise above the upper level of the gap in which it is disposed during the various degrees of expansion and contraction of the structural members associated with the joint of which the seal is a part.

In summary, the present invention provides an elastomeric seal for an expansion joint wherein the seal has an intermediate web construction for spanning the expansion gap with tubular mounting beads attached along each of the longitudinal edges of the web construction.

Each of the mounting beads is adapted to be compressed for insertion into a C-shaped cavity of predetermined curvature formed in an edge member, as referred to hereinabove. Each bead includes an S-shaped wall portion adjacent to the edge member cavity opening. The web portion of the seal includes upper and lower walls spaced apart one from the other to span the expansion gap. The upper and lower walls are connected to the beads at correspondingly upper and lower locations on the S-shaped wall portions of the beads. The upper and lower walls include V-shaped configurations at their mid-portions whereby such walls fold downwardly upon compression of the seal. A pair of struts are disposed between the upper and lower walls, in a disposition converging towards one another in a downward direction, and extend generally between the edges of the V-shaped configurations in the upper and lower walls. The struts cause the upper and lower walls to work together and function to insure that both walls fold downwardly upon compression of the seal. The mid-portion of the upper wall includes a crowned configuration, the apex of which tends to maintain its vertical disposition upon extreme compression of the seal (i.e. downward folding of the upper and lower walls) whereby incompressible materials are ejected out of the joint opening.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

DETAILED DESCRIPTION OF THE ILLUSTRATED EMBODIMENT

Figure 1:
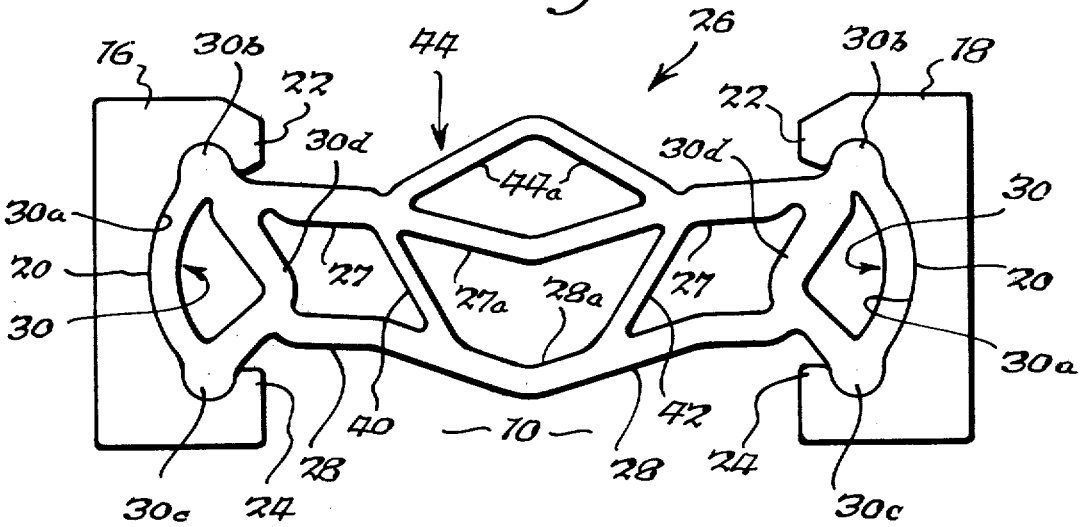
FIG. 1 is a vertical sectional view of a relatively wide expansion joint according to the invention bridging a pair of spaced structural slab members.
Figure 2:
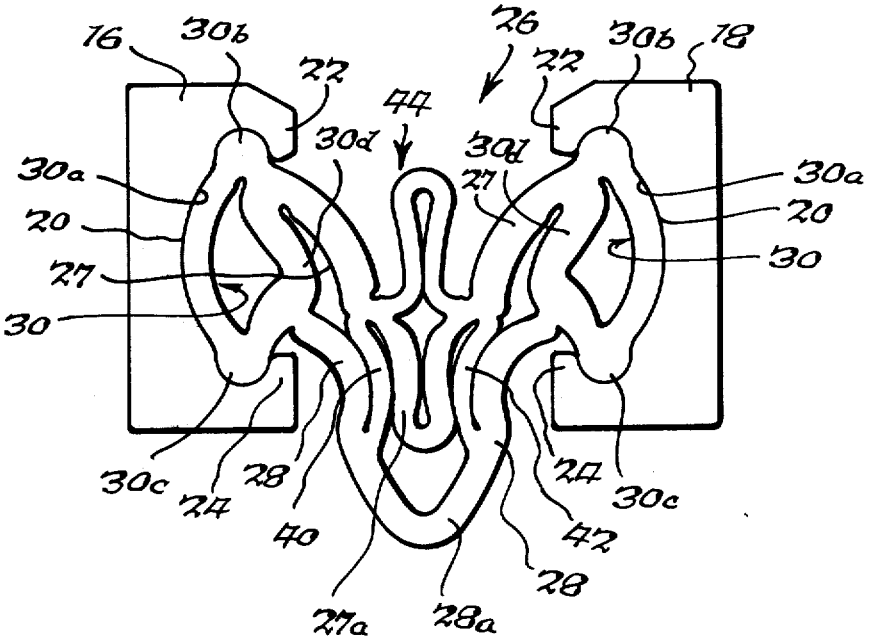
FIG. 2 is a vertical sectional view showing the seal of FIG. 1 in a compressed condition.

Referring in detail to the illustrative embodiment depicted in the accompanying drawings, there is shown in FIG. 1 an expansion joint seal for bridging the gap 10 between a pair of structural slab members as might be found in a roadway, for example. Specifically, a pair of spaced apart, elongated, edge members 16 and 18 are embedded or permanently affixed to slab members as is well known in the prior art. Each of the edge members includes a C-shaped cavity 20 having a preselected radius of curvature wherein each of the cavities opens towards the gap 10 as defined by the edge members 16 and 18. Each cavity opening is defined between opposed projecting portions of the edge member as indicated at 22 and 24, such projecting portions being spaced from each other a distance less than the maximum dimension within the cavity taken generally parallel to the opening defined between projections 22 and 24. In other words, the cavity opening is less than the internal vertical height of such cavity.

In FIG. 1, an elongated resilient seal 26 is shown in transverse cross-section for assembly with the edge member cavities described hereinabove for sealing of the gap 10. The elastomeric seal 26 includes an intermediate web portion having upper and lower walls 27 and 28 respectively spanning the gap 10 and a mounting bead portion 30 extending along each of the longitudinal edges of the walls 27 and 28. The web walls 27 and 28 include longitudinal, downwardly extending folds of V-shaped configuration, 27a and 28a respectively, located substantially along the center line of the gap 10. As described in detail hereinbelow, the folds 27a and 28a move downwardly in a manner corresponding to the degree of contraction in the width of the gap 10.

In addition, a pair of struts 40 and 42 are disposed to extend between the upper wall 27 and lower wall 28 in a converging manner with respect to one another. The ends of the struts are generally connected at the corresponding end portions of the V-shaped folds 27a and 28a. The struts 40 and 42 cause the upper and lower web walls 27 and 28 to work together and to insure that such upper and lower walls fold downwardly in a controlled manner with respect to one another. Furthermore, the struts 40 and 42 provide additional strength to the entire web configuration. It is important that the struts 40 and 42 be disposed at a sufficient converging angle with respect to one another so that the entire web seal folds in an efficient manner during contraction of the gap width.

The top of the upper web wall 27 is surmounted by a crowned, inverted V-shaped configuration. Such crowned portion 44 is joined to the upper web wall generally at the ends of the V-shaped portion 27a so that the upper ends of the struts 40 and 42 generally underly the end points of crown 44. As also described hereinbelow, crown 44 functions to keep incompressibles out of the joint gap, particularly during contraction of the gap.

Each of the mounting beads 30 includes in cross-section an outer curved surface portion 30a for matching engagement with the encompassing wall surface of cavity 20 when in assembled position therewith. The upper and lower opposed portions 30b and 30c of the bead are provided to correspondingly abut the opposed projecting portions 22 and 24 of the edge member whereby lateral movement of the bead towards the gap 10 is resisted, as is apparent from all of the FIGS. 1-4.

As fully described in applicant's issued U.S. patents referred to hereinabove, the curved outer wall surface of the beads in an upstressed disassembled form is provided with a preselected radius of curvature which is less than the radius of curvature of the corresponding arc of the wall portion in cavity 20. Upon assembly, the bead wall conforms to the cavity wall and becomes tightly locked thereagainst. This results by action of the cavity walls deforming the arc of the bead walls 30a to assume a larger radius of curvature whereby bead portions 30b and 30c become firmly engaged behind the cavity projections 22 and 24 respectively. In addition, each mounting bead 30, being of a tubular configuration, includes a spring or S-shaped wall portion 30d which extends between the bead portions 30b and 30c so as to provide the aforesaid tubular configuration to the bead. The S-shaped configuration 30d is subject to changes in form depending upon the degree of expansion or contraction of gap 10.

In operation, the beads 30 are firmly locked in cavities 20 at all times. When the gap 10 is relatively wide, as shown in FIG. 1, the apex of the inverted V-shaped crown 44 will be slightly below the top surfaces of the edge members 16 and 18. This fact is important so that traffic passing thereover does not cause any more wear on the seal than is necessary. As the gap 10 undergoes varying degrees of contraction, the crowned portion 44 closes, but instead of moving upwardly tends to move only slightly downwardly depending on the degree of contraction in the gap. In other words, the end points of the crowned portion 44 are carried downwardly with the upper wall 27 but the apex of crown 44 does not move downwardly in direct porportion to the downward movement of upper wall 27 since the crown leg portions 44a tend to assume more of a vertical orientation as the gap narrows.

In this regard, the crown 44, and the apex thereof in particular, functions to preclude the lodging of incompressible materials in the gap area. As seen most clearly in FIG. 2, the apex of the crown 44 serves as an obstruction, in what would otherwise be a void space, to incompressible debris tending to accumulate in the gap. Of course, as the gap widens, as viewed in FIG. 1, the entire upper surface, including crown 44 of the seal, tends to flatten out and move to a vertical disposition closer to the upper surfaces of the edge members 16 and 18. During all phases of seal movement, the struts 40 and 42, being disposed in a converging angular relationship, function to allow upper and lower walls 27 and 28 to undergo movement in a smoothly controlled manner with respect to one another.

Figure 3:
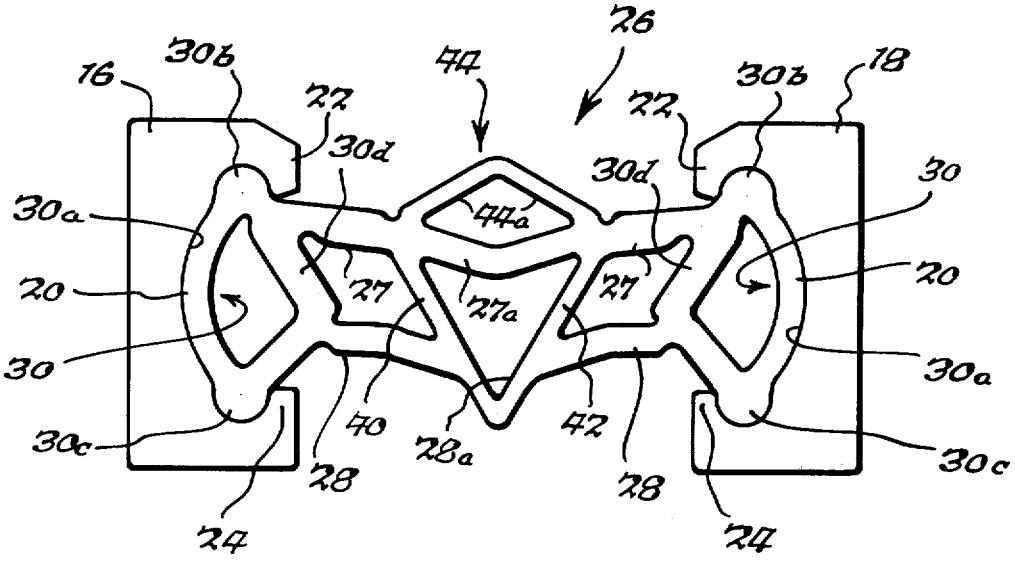
FIG. 3 is a vertical sectional view of an expansion joint relatively narrower than that shown in FIG. 1 showing a seal of the present invention slightly modified in construction as compared to the FIG. 1 construction.
Figure 4:
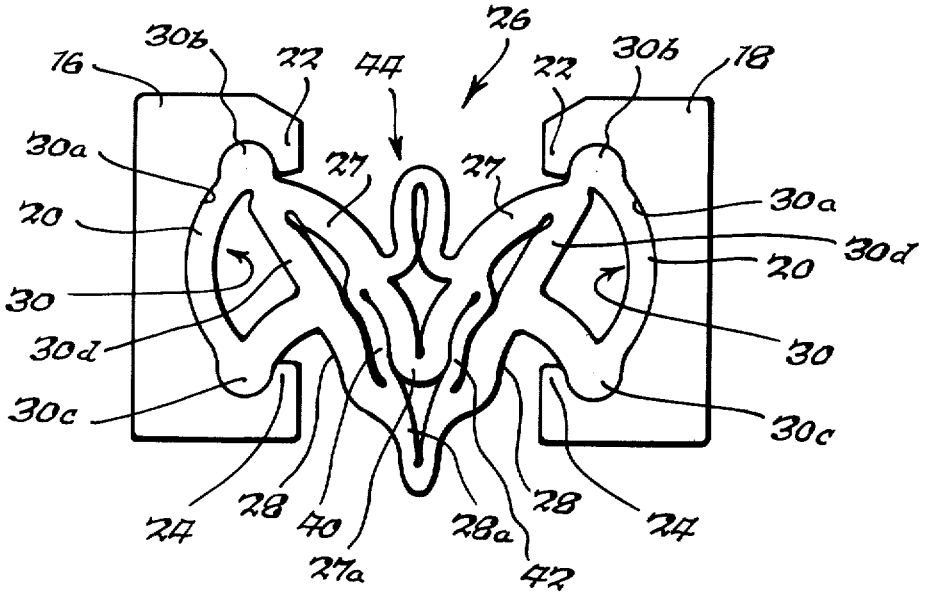
FIG. 4 is a vertical sectional view showing the seal of FIG. 3 in a condition of compression greater than that in FIG. 3.

FIGS. 3 and 4 show a similar seal to that illustrated in FIGS. 1 and 2–FIG. 4 showing the seal in FIG. 3 under a state of compression. The FIGS. 3/4 seal operates in a manner similar to that described with respect to the FIGS. 1/2 seal and in fact includes the same structural components in a slightly different configuration. The FIGS. 3/4 seal is designed for use in an expansion joint having a smaller over-all movement. In this regard, the V-shaped fold 28a in the lower wall of the FIGS. 3/4 is more pronounced and in more of an alignment with the struts 40 and 42. This is in contrast to the flatter configuration of the fold 28a in FIG. 1. Accordingly, it is to be understood that the maximum opening between the gap edges may be smaller for the FIGS. 3/4 seal than for the FIGS. 1/2 seal. The FIGS. 3/4 seal could be used in areas where physical limitations may exist, due to controls or specifications. One such control may be rideability of the joint. Other limitations may simply be that greater movement is not required, and therefore a more economical (smaller) seal may be justified.

From the foregoing, it is apparent that the objects of the present invention have been fully accomplished. As a result of this invention, an improved elastomeric seal has been provided having a rugged, durable web construction of double wall design wherein the walls efficiently operate or move with respect to one another. In addition, the seal provides such a double wall construction while including the further feature of being self-cleaning with respect to any incompressible type of debris which may tend to collect in the expansion gap.

Having thus described and illustrated a preferred embodiment of the invention, it will be understood that such description and illustration is by way of example only and such modifications and changes as may suggest themselves to those skilled in the art are intended to fall within the scope of the present invention as limited only by the appended claims.

I claim:

1. An expansion joint seal for bridging and sealing a gap between a pair of spaced-apart elongated edge members being respectively disposed in a pair of structural slabs to define the gap therebetween, each said edge member having in cross-section a generally C-shaped cavity with a preselected radius of curvature, each said cavity opening towards said gap defined between said edge members wherein each said cavity opening is defined between opposed projecting portions of said respective edge members spaced from each other at a distance less than the maximum dimension within said cavity taken generally parallel to said opening, said seal comprising:

a web portion spanning said gap and a mounting bead portion extending along each longitudinal edge of said web portion wherein each of said mounting bead portions is received within said cavity of a corresponding edge member, and each said mounting bead having in cross-section an outer surface portion for matching engagement with said cavity with opposed portions of said mounting bead correspondingly abutting said opposed projecting portions of said edge member whereby relative lateral movement of said mounting bead with respect to said edge member is resisted and, said web portion including upper and lower walls spaced apart from one another to span said gap and being attached along their longitudinal edges to correspondingly upper and lower portions of said mounting bead portions wherein each of said walls includes a longitudinal, downwardly extending fold located substantially along the center line of said gap, said web portion further including a pair of strut members extending between said walls in a downwardly converging relationship with respect to one another for coordinating the movement of said walls during expansion and contraction of said seal, and the upper surface of said upper wall having an inverted V-shaped crown portion joined thereto and located substantially along the center line of said gap whereby the apex of said crown portion is adapted to remain disposed below the upper surface of the structural slabs associated therewith throughout the operational range of said seal.

2. The expansion joint seal is set forth in claim 1 wherein each of said mounting beads is in cross-section of hollow, tubular configuration and includes a spring shaped wall portion extending between said opposed portions of said mounting bead which abut said opposed projecting portions of said edge member.

3. The expansion joint seal as set forth in claim 2 wherein each spring shaped wall portion is of generally S-shaped configuration.

4. The expansion joint seal as set forth in claim 1 wherein said struts are joined to and extend between said walls at corresponding points generally adjacent to the edges of said downwardly extending folds.

5. The expansion joint seal as set forth in claim 4 wherein the edges of said crown portion join said upper wall at points generally coincident with the corresponding points at which said struts join said upper wall.

6. The expansion joint seal is set forth in claim 2 wherein said struts are joined to and extend between said walls at corresponding points generally adjacent to the edges of said downwardly extending folds.

7. The expansion joint seal as set forth in claim 6 wherein the edges of said crown portion join said upper wall at points generally coincident with the corresponding points at which said struts join said upper wall.

*8. An expansion joint seal for bridging and sealing a gap between a pair of spaced, elongated joint edge members respectively disposed in a pair of structural slabs to define the gap therebetween, each edge member having a seal-retaining cavity opening toward the gap defined between the edge members, said seal comprising:*

*a web portion spanning the gap and a mounting bead portion extending along each longitudinal edge of said web portion wherein each of said mounting bead portions is received within the cavity of the corresponding edge member, each said mounting bead portion having in cross section an outer surface portion for engagement with said cavity whereby relative lateral movement of said mounting bead portion with respect to the edge member is resisted, said web portion including an upper wall and a lower wall spaced from one another to span the gap and being connected along their longitudinal edges to corresponding upper and lower portions of said mounting bead portions, wherein at least one of said walls includes a longitudinal, downwardly extending fold located substantially along its mid-portion, said web portion further including a pair of strut members extending between said walls in a downwardly converging relationship with respect to one another for coordinating the movement of said walls during expansion and contraction of said seal, the upper surface of said upper wall having a crown portion located substantially along the mid-portion of said upper wall, whereby the top surface of said crown portion is adapted to remain disposed below the upper surface of the structural slabs associated therewith throughout the operational range of said seal.*

*9. The seal of claim 8 wherein said upper crown portion has an outer surface of generally convex shape.*

*10. The seal of claim 8 wherein said upper crown portion is defined by upper crown leg portions, each of which has an inner and an outer end, said inner ends being joined together at an obtuse angle to form an inverted, substantially V-shape with the apex of the V directed upwardly.*

*11. The seal of claim 8 wherein the edges of said crown portion join said upper wall at points generally coincident with the corresponding points at which said struts join said upper wall.*

*12. The seal of claim 11 wherein said lower wall fold is defined by lower leg portions, each of which has an inner and an outer end, said inner ends being joined together to*

*form a substantially V-shape with the apex of the V directed downwardly.*

*13. The seal of claim 12 wherein said lower leg portions are so disposed as to define an cute angle therebetween.*

*14. The seal of claim 12 wherein said lower leg portions are so disposed as to define an obtuse angle therebetween.*

*15. The seal of claim 12 wherein said upper and said lower walls of said intermediate web portions are substantially parallel.*

* * * * *